STATIC INVERTERS
Filed Sept. 5. 1961
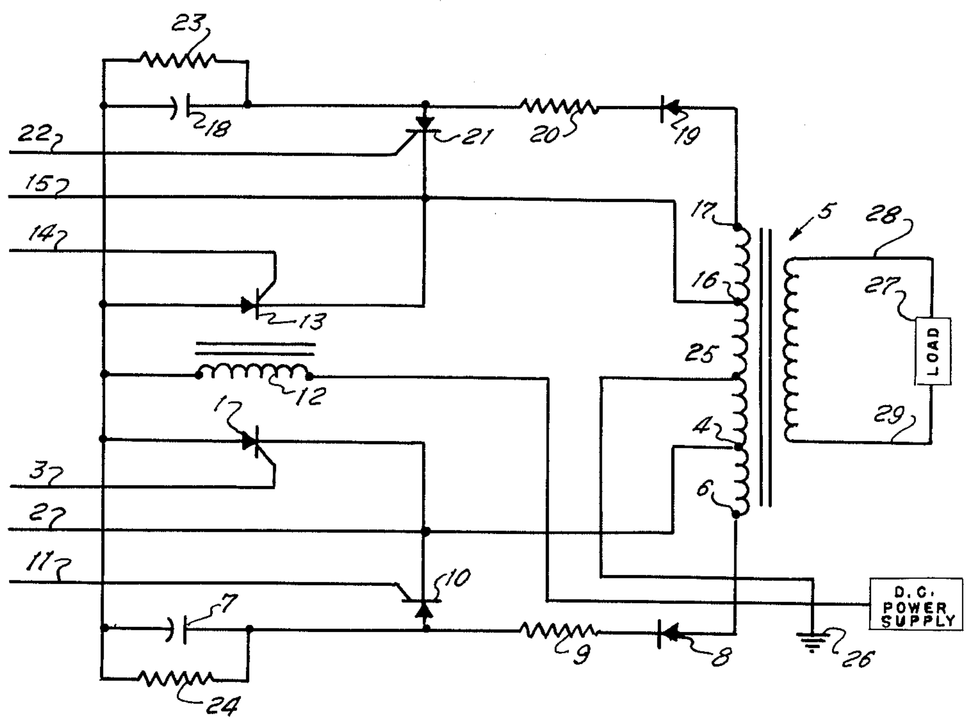
INVENTOR
Winston O. Faith
BY Arthur M. Sloan
ATTORNEY United States Patent Office 3,213,352
Patented Oct. 19, 1965

3,213,352
STATIC INVERTERS

Winston O. Faith, Garland, Tex., assignor to Varo Inc.
Filed Sept. 5, 1961, Ser. No. 135,908
4 Claims. (Cl. 321—45)

This invention relates to a new and improved static inverter for converting direct current power to alternating current power.

For many years transistors and other switching devices have been used for converting D.C. power to A.C. power. This invention uses silicon controlled rectifiers for the basic switch element. Heretofore in parallel inverters utilizing silicon controlled rectifiers, the silicon controlled rectifier conducting the power could not be cut off during the half cycle. It was necessary that each conducting silicon controlled rectifier be cut off at the end of the half cycle when the other silicon controlled rectifier was turned on. This approach is the first one offering variable pulse width control of silicon controlled rectifier inverters.

An object of the invention is to convert direct current power to alternating current power using solid state electronic devices.

Another object of the invention is to convert direct current power to alternating current power with great efficiency at higher voltages.

A further object of the invention is to provide a static inverter of light weight and high efficiency, capable of operating at high voltages and currents.

Another object of the invention is to provide a static inverter using silicon controlled rectifiers in such manner that conduction may be produced for any portion of a half cycle of the output frequency.

Additional objects and advantages of the invention will be readily apparent from the reading of the following description of a device constructed in accordance with the invention.

Four silicon controlled rectifiers are used in a circuit which provides alternate switching of the direct current power to one-half of the transformer primary winding and then to the other half for generating alternating current. Two of the silicon controlled rectifiers are used to conduct the major portion of the power during each alternate half cycle and the other two are used to cut off those two at the proper time during the half cycle so that a variable pulse width during each half cycle can be obtained for purposes of voltage regulation.

Referring to the single figure of drawing a schematic circuit diagram of the static inverter the circuit operation can best be understood by going through a cycle of operation.

With silicon controlled rectifier 1 conducting after being turned on by a drive pulse supplied between terminals 2 and 3, the lower tap 4 of the transformer 5 will be connected to a D.C. power source through inductor 12 and silicon controlled rectifier 1. A voltage value corresponding to that of the power supply appears across the output terminals 28 and 29. A large positive voltage will appear from the lower tap 4 to the lower end 6 of the transformer 5.

This large positive voltage charges capacitor 7 through diode 8 and resistor 9. Resistor 9 reduces peak charging current and diode 8 prevents dicharge of capacitor 7 until the stored energy is needed for commutation. At the end of the on time, silicon controlled rectifier 10 is fired by a drive pulse supplied between terminals 2 and 11, and the current through silicon controlled rectifier 1 is diverted through capacitor 7 and silicon controlled rectifier 10 for a period of time which is sufficient for silicon controlled rectifier 1 to recover its blocking characteristics. Inductor 12 serves to prevent current spikes during this turn-off period, and also provides an oscillatory circuit with capacitor 7 which reverses the current through silicon controlled rectifier 10, thereby turning it off.

Next, silicon controlled rectifier 13 is turned on by a drive pulse supplied between terminals 14 and 15. This connects the upper tap 16 of transformer 5 to a D.C. power source through inductor 12 and silicon controlled rectifier 13. A voltage value corresponding to that of the power supply appears across the output terminals 28 and 29. The large positive voltage at the upper end 17 of the transformer 5 charges capacitor 18 through diode 19 and resistor 20. At the end of the on time silicon controlled rectifier 21 is turned on by a drive pulse supplied between terminals 15 and 22, and the current through silicon controlled rectifier 13 is diverted through capacitor 18 and silicon controlled rectifier 21 for a period of time which is sufficient for silicon controlled rectifier 13 to recover its blocking characteristics. Inductor 12 forms an oscillatory or ringing circuit with capacitor 18 which reverses the current through silicon controlled rectifier 21, thereby turning it off. Resistors 23 and 24 provide a discharge path so that each time the drive signals are applied, capacitors 7 and 18 will be in the discharged condition. The output terminals 28 and 29 are connected to load 27. The center tap 25 of transformer 5 is connected to ground 26.

The portion of transformer 5 between lower tap 4 and upper tap 16 is effectively the transformer primary since it is the input winding. The portions of transformer 5 between lower tap 4 and lower end 6 and between upper tap 16 and upper end 17 are auxiliary secondary windings which may be designated as commutation windings or feedback windings.

The time difference between the drive pulse at terminals 2 and 3 and the drive pulse at terminals 2 and 11 determines the pulse width driving the half cycle in which silicon controlled rectifier 1 is conducting. Likewise the time difference between the drive pulse at terminals 14 and 15 and the drive pulse at terminals 15 and 22 determines the pulse width driving the half cycle in which silicon controlled rectifier 13 is conducting. Thus the variable pulse width feature of this invention is controlled by controlling the time difference between the drive pulses.

While a particular embodiment of the invention has been shown and described, it is apparent that modifications and alterations may be made, and it is intended in the appended claims to cover all such modifications and alterations as may fall within the true spirit and scope of the invention.

What is claimed is:

1. A static inverter comprising a transformer including a primary winding with a center tap and two commutation windings, one of the commutation windings in series with one end of the primary winding and the other commutation winding in series with the other end of the primary winding, two capacitors for commutation, one in series with one of the transformer commutation windings and one in series with the other transformer commutation winding, four resistors, one in series with each of the two commutation capacitors for reducing peak charging current and one in parallel with each of the two commutation capacitors for providing a discharge path so that each time the drive signals are applied the commutation capacitors will be in the discharged condition, two diodes, each one in series with one of the two commutation capacitors for preventing discharge of the commutation capacitors until the stored energy is needed for commutation, the resistors and diodes in series with the commutation capacitors being interposed electrically in the circuit between the commutation capacitors and the transformer commutation windings, the center tap on the transformer primary winding extending to ground, two silicon controlled rectifiers to alternately conduct direct current power to one-half of the transformer primary winding and then to the other half, two silicon controlled rectifiers to cut off the conducting silicon controlled rectifiers at a predetermined time, said cut off silicon controlled rectifiers having their cathode electrodes connected to the cathode electrodes of the conducting silicon controlled rectifiers which they cut off and their anode electrodes connected to one of the commutation capacitors, an inductor coil connecting the upper and lower ends of the transformer primary winding to a D.C. power supply through the two conducting silicon controlled rectifiers, said inductor coil serving to prevent current spikes during turn off of the silicon controlled rectifiers and also providing an oscillatory circuit with each commutation capacitor, each commutation capacitor being connected to the inductor coil and to the anode electrodes of a conducting silicon controlled rectifier and its cut off silicon controlled rectifier, and means providing a separate drive pulse to turn on each silicon controlled rectifier, said drive pulse means being connected to the gate electrode of each silicon controlled rectifier and to the ends of the primary winding through connections common to the cathode electrode of each conducting silicon controlled rectifier and its cut off silicon controlled rectifier.

2. A static inverter comprising a transformer including a primary winding with a center tap and two commutation windings, one of the commutation windings in series with one end of the primary winding and the other commutation winding in series with the other end of the primary winding, and a secondary winding, two capacitors, one connected in series with one of the transformer commutation windings and one connected in series with the other transformer commutation winding, two resistors, each one in series with one of the two capacitors, two resistors, each one in parallel with one of the two capacitors, two diodes, each one in series with one of the two capacitors, the resistors and diodes in series with the capacitors being interposed between the capacitors and the transformer commutation windings, the center tap on the transformer primary winding extending to ground, two silicon controlled rectifiers to alternately conduct direct current power to one-half of the transformer primary winding and then to the other half, two silicon controlled rectifiers to cut off the conducting silicon controlled rectifiers at a predetermined time, said cut off silicon controlled rectifiers having their cathode electrodes connected to the cathode electrodes of the conducting silicon controlled rectifiers which they cut off and their anode electrodes connected to one of the commutation capacitors, an inductor coil connecting the upper and lower ends of the transformer primary winding to a D.C. power supply through the two conducting silicon controlled rectifiers, each capacitor being connected to the inductor coil and to the anode electrodes of a conducting silicon controlled rectifier and its cut off silicon controlled rectifier, means providing a separate drive pulse to turn on each silicon controlled rectifier, said drive pulse means being connected to the gate electrode of each silicon controlled rectifier and to the ends of the primary winding through connections common to the cathode electrode of each conducting silicon controlled rectifier and its cut off silicon controlled rectifier, said transformer secondary being connected to a load.

3. A static inverter comprising a transformer including a primary winding with a center tap and two commutation windings, one of the commutation windings in series with one end of the primary winding and the other commutation winding in series with the other end of the primary winding, and a secondary winding, two capacitors, one connected in series with one of the transformer commutation windings and one connected in series with the other transformer commutation winding, two resistors, each one in series with one of the two capacitors, two resistors, each one in parallel with one of the two capacitors, two diodes, each one in series with one of the two capacitors, the resistors and diodes in series with the capacitors being interposed between the capacitors and the transformer commutation windings, the center tap on the transformer primary winding extending to ground, two silicon controlled rectifiers to alternately conduct direct current power to one-half of the transformer primary winding and then to the other half, two silicon controlled rectifiers to cut off the conducting silicon controlled rectifiers at a predetermined time, said cut off silicon controlled rectifiers having their cathode electrodes connected to the cathode electrodes of the conducting silicon controlled rectifiers which they cut off and their anode electrodes connected to one of the commutation capacitors, the anode electrodes of all the silicon controlled rectifiers being connected, an inductor coil connecting the upper and lower ends of the transformer primary winding to a D.C. power supply through the two conducting silicon controlled rectifiers, each capacitor being connected to the inductor coil and to the anode electrodes of a conducting silicon controlled rectifier and its cut off silicon controlled rectifier, means providing a separate drive pulse to turn on each silicon controlled rectifier, said drive pulse means being connected to the gate electrode of each silicon controlled rectifier and to the ends of the primary winding through connections common to the cathode electrode of each conducting silicon controlled rectifier and its cut off silicon controlled rectifier, said transformer secondary being connected to a load.

4. A static inverter comprising a transformer including a primary winding with a center tap and two commutation windings, one of the commutation windings in series with one end of the primary winding and the other commutation winding in series with the other end of the primary winding, and a secondary winding, two capacitors, one connected in series with one of the transformer commutation windings and one connected in series with the other transformer commutation winding, two resistors, each one in series with one of the two capacitors, two resistors, each one in parallel with one of the two capacitors, two diodes, each one in series with one of the two capacitors, the resistors and diodes in series with the capacitors being interposed between the capacitors and the transformer commutation windings, the center tap on the transformer primary winding extending to ground, two silicon controlled rectifiers to alternately conduct direct current power to one-half of the transformer primary winding and then to the other half, two silicon controlled rectifiers to cut off the conducting silicon controlled rectifiers at a predetermined time, said cut off silicon controlled rectifiers having their cathode electrodes connected to the cathode electrodes of the conducting silicon controlled rectifiers which they cut off and their anode electrodes connected to one of the commutation capacitors, the anode electrodes of all the silicon controlled rectifiers being connected, the anode electrode of each conducting silicon controlled rectifier being connected to the anode electrode of its cut off silicon controlled rectifier through one of the two capacitors, an inductor coil connecting the upper and lower ends of the transformer primary winding to a D.C. power supply through the two conducting silicon controlled rectifiers, each capacitor being connected to the inductor coil and to the anode electrodes of a conducting silicon controlled rectifier and its cut off silicon controlled rectifier, means providing a separate drive pulse to turn on each silicon controlled rectifier, said drive pulse means being connected to the gate electrode of each silicon controlled rectifier and to the ends of the primary winding through connections common to the cathode electrode of each conducting silicon controlled rectifier and its cut off silicon controlled rectifier, said transformer secondary being connected to a load.

References Cited by the Examiner

UNITED STATES PATENTS

| | | | |
|---|---|---|---|
| 2,883,539 | 4/59 | Bruck et al. | 321—2 X |
| 3,047,789 | 7/62 | Lowry | 321—18 |

OTHER REFERENCES

"Electronics" bulletin by Allan G. Lloyd, 1960, pp. 92–94.

"G.E. S.C.R. Manual"—First ed., Mar. 21, 1960, pp. 70–73, and 138–143.

LLOYD McCOLLUM, *Primary Examiner.*